(12) United States Patent
Laackmann et al.

(10) Patent No.: US 8,166,561 B2
(45) Date of Patent: Apr. 24, 2012

(54) SECURITY DEVICE, SECURE MEMORY SYSTEM AND METHOD USING A SECURITY DEVICE

(75) Inventors: Peter Laackmann, Munich (DE); Marcus Janke, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1041 days.

(21) Appl. No.: 12/030,656

(22) Filed: Feb. 13, 2008

(65) Prior Publication Data

US 2010/0031059 A1    Feb. 4, 2010

(51) Int. Cl.
*G06F 17/30* (2006.01)
*G06F 21/00* (2006.01)
*G06F 9/00* (2006.01)
*G06F 11/30* (2006.01)
*H04L 9/00* (2006.01)

(52) U.S. Cl. ............... 726/27; 726/28; 726/29; 726/30; 705/51; 713/138; 713/192; 380/277

(58) Field of Classification Search .......... 726/227–230, 726/27–30
See application file for complete search history.

(56) References Cited

U.S. PATENT DOCUMENTS

| | | | |
|---|---|---|---|
| 2005/0267845 A1* | 12/2005 | Oh et al. | 705/51 |
| 2007/0033320 A1 | 2/2007 | Wu et al. | |
| 2007/0214369 A1 | 9/2007 | Roberts et al. | |
| 2010/0169636 A1* | 7/2010 | Davis et al. | 713/2 |

FOREIGN PATENT DOCUMENTS

| | | |
|---|---|---|
| WO | WO-98/32065 A2 | 7/1998 |
| WO | WO-01/35193 A1 | 5/2001 |

* cited by examiner

*Primary Examiner* — Jeffrey D Popham
*Assistant Examiner* — Evans Desrosiers
(74) *Attorney, Agent, or Firm* — Dickstein Shapiro LLP

(57) ABSTRACT

A security device including a first external interface; a second external interface; and a security controller connected to said first external interface and said second external interface, said security controller being adapted to validate an access right based on a codeword received via said first interface to perform an encrypted memory access via said second external interface to an external memory coupleable to said second external interface, and to prevent that encrypted memory access via said first external interface or prevent any output of data via said first external interface depending on data received via said second external interface in case of a negative validation.

24 Claims, 12 Drawing Sheets

SECURITY DEVICE, SECURE MEMORY SYSTEM AND METHOD USING A SECURITY DEVICE

BACKGROUND OF THE INVENTION

Memory cards such as MMC (MMC=Multi Media Card), SD (SD=Secure Digital), etc and USB (Universal Serial Bus) memory sticks are well-accepted technologies for mobile storage of large volumes of data. As the storage capacity continuously increases, end-users are looking for memory cards and/or memory sticks with larger memories. In addition, end-users want their data to be stored in a secure manner on these memory cards or memory sticks.

Known solutions are, for example, providing software on the USB-stick or the integration of large memories on one chip, respectively the integration of a memory chip and a memory control chip in a multi-package.

SUMMARY

According to an embodiment, a security device comprises a first external interface; a second external interface; and a security controller connected to the first external interface and the second external interface, the security controller being adapted to validate an access right based on a codeword received, via the first interface to perform an encrypted memory access via the second external interface to an external memory coupled to the second external interface, and to prevent the encrypted memory access via the external interface or prevent any output of data via the first external interface depending on data received via the second external interface in the case of a negative validation.

BRIEF DESCRIPTION OF THE DRAWINGS

Embodiments are described hereinafter, making reference to the appended drawings.

Figure 1:
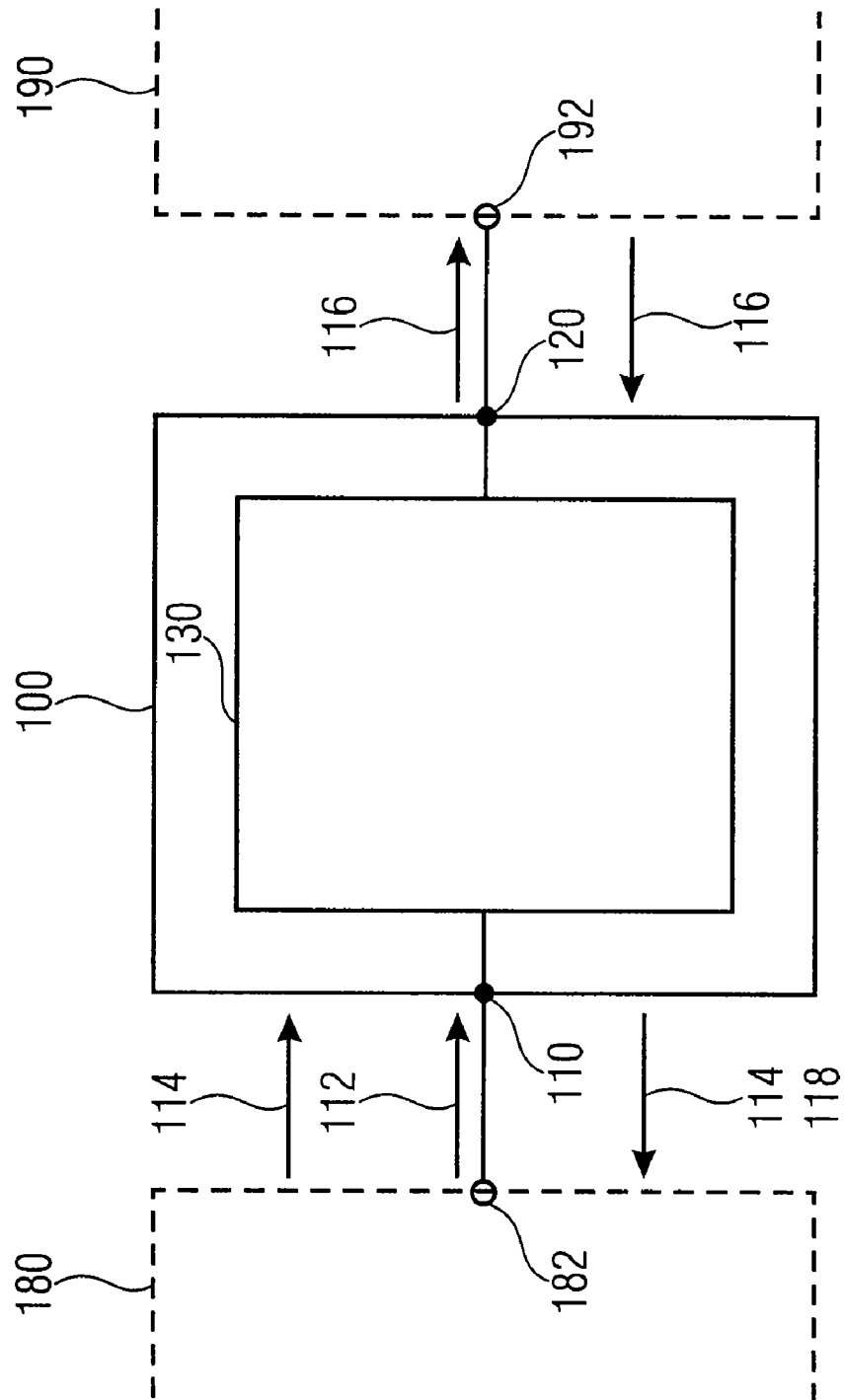
FIG. 1 shows a block diagram of an embodiment of a security device.

Equal or equivalent elements are denoted in the following description of the figures by equal or equivalent reference numerals.

DETAILED DESCRIPTION OF THE INVENTION

FIG. 1 shows a block diagram of an embodiment of a security device 100 comprising a first external interface 110, a second external interface 120 and a security controller 130. The security controller 130 is connected to the first external interface 110 and the second external interface 120. The security controller 130 is adapted to control the data flow between the first external interface 110 and the second external interface 120. The security device 100 can be connected to, for example, a host system 180 via host system interface 182 of the host system and the first external interface 110, and for example, to an external memory 190 via a memory interface 192 of the external memory 190 and the second external interface 120. The security controller 130 is adapted to receive a codeword 112, for example, from the host system 180 via the first external interface 110. The security controller 130 is further adapted to perform a validation of an access right, i.e., the right to access, for example, the external memory 190 via the second external interface.

The validation can be performed, for example, by comparing the received codeword 112 with a stored codeword, which may be stored in a fixed or programmable manner. In this case, the validation is positive when the received codeword 112 and the stored codeword are equal, or have at least a predetermined relationship, which is checked during the validation. The validation will be negative in the case of the received codeword 112 not being equal to the stored codeword, or if it does not fulfill the requirement of having the predetermined relationship to the stored codeword.

The security controller 130 is adapted, in the case of a negative validation, to prevent an encrypted memory access via the second external interface to the external memory coupled to the second external interface 120. In the case of a positive validation, the security controller is adapted to perform a "write encrypted memory access" as encrypted memory access by encrypting data 114 received via the first external interface 110, for example, from the host system 180, using an encryption algorithm and outputting the received data in an encrypted manner, i.e., as encrypted data 116, to the external memory 190 via the second external interface 120, and/or is adapted to perform a "read encrypted memory access" as encrypted memory access, by decrypting the decrypted data 116 received from the connectable external memory 190 via the second external interface 120, using a decryption algorithm and outputting the decrypted data 114, or in other words plain data 114 via the first external interface 110.

In another embodiment, the security controller 130 is adapted to output processed data 118 via the first external interface 110 which is generated based on decrypted data 116 received from the connectable external memory 190 via the second external interface 120 in the case of a positive validation and which is processed according to specific manner before being output via the first external interface 110.

In case the first external interface and the external interface are not the same interfaces, for example the first external interface being a USB-interface and the second interface being a memory card interface, the security device 100 can also be adapted to convert signals from one interface to comply with the interface requirements of the other interface. This conversion can be performed by the security controller 130 or by other means.

Figure 2:
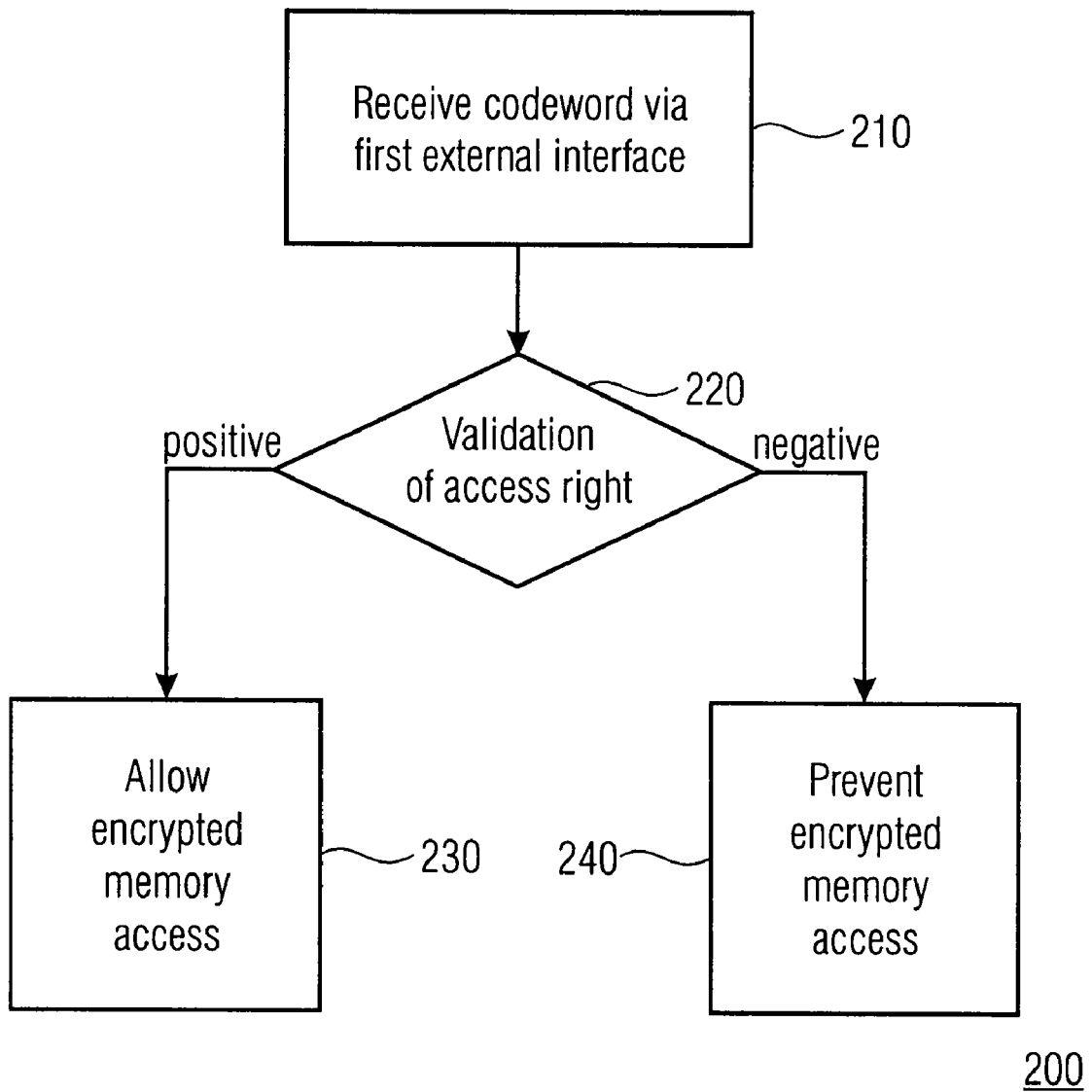
FIG. 2 shows a flow chart of an embodiment of the validation of the access right to perform an encrypted memory access.

FIG. 2 shows an embodiment of a validation process 200 performed by the security controller 130.

In 210 the security controller 130 receives the codeword 112 via the first external interface 110.

In 220 the security controller 130 performs the validation of the access right to perform an encrypted memory access via the second external interface 120 based on the received codeword 112.

In case of the validation being positive, e.g. an encrypted memory access is allowed, see 230. In the case of the validation being negative, the encrypted memory access is prevented, see 240.

Figure 3:
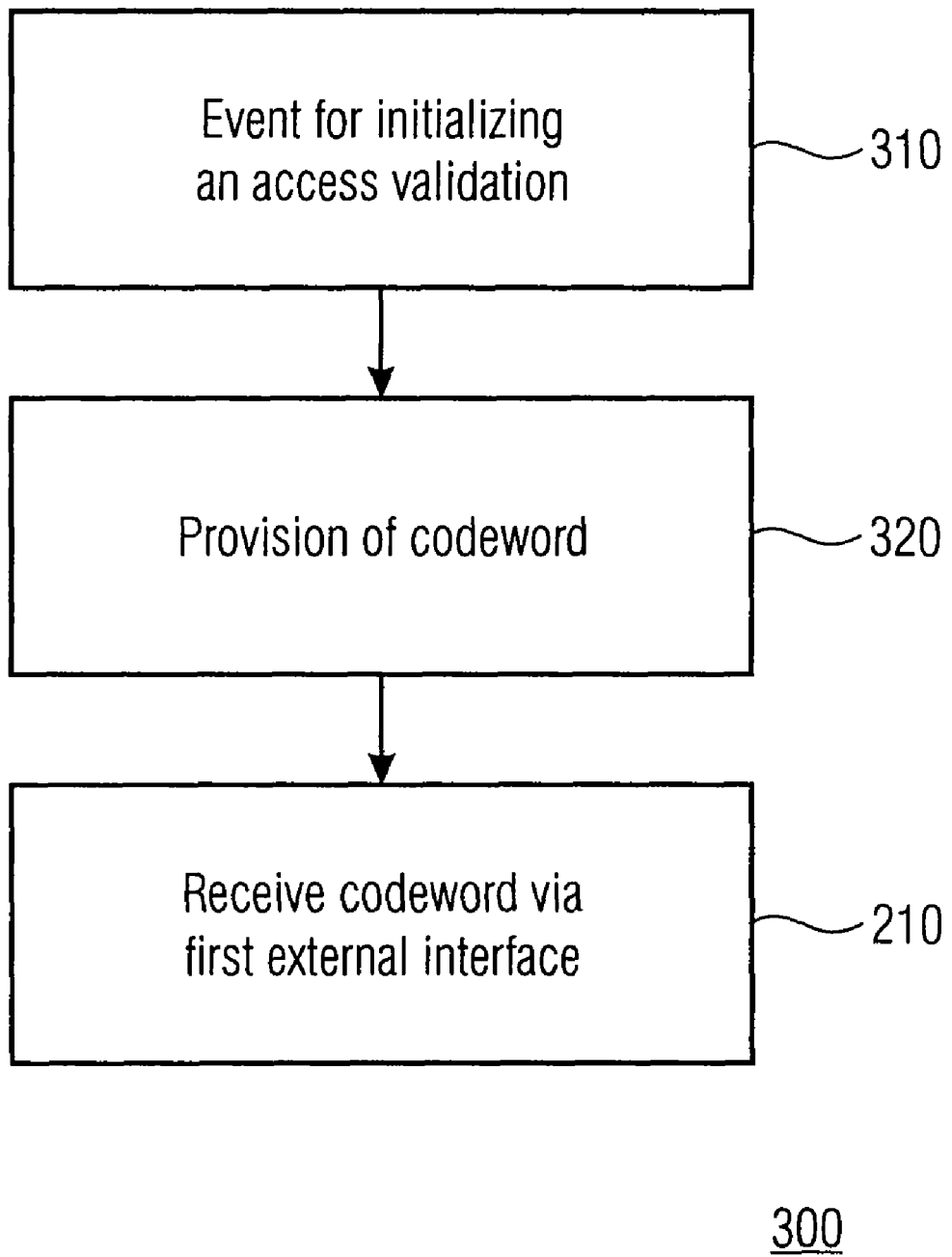
FIG. 3 shows a flow chart of an embodiment for providing a codeword for the access right validation.

FIG. 3 shows a flow chart of an embodiment of a codeword provision process 300.

In 310 an event for initializing the validation, as for example described in FIG. 2, occurs. The event may be triggered by the security device, or for example, the host system 180. Embodiments where the event for initializing the validation is triggered by the security controller 130 itself, do not depend on the host system or the host system's security policies. Thus, independent of the host system's security policy different security policies with regard to when the validation should be performed can be autonomously implemented on the security controller 130. An event for triggering the initialization of the validation is, for example, the time instant the security device 100 is coupled or connected to the host system 180. Other events are, for example, a request received at the security controller 130 from the host system 180 to access the external memory 190, or to receive an output from the security controller 130, which is based on processing data from the external memory 190. Alternatively, the event may only be the first request as described before, after the security device 100 has been connected to the host system 180. A further possibility for an event, is a time-out event, or in other words, initializing a validation or re-validation after a given time has elapsed. In case the security controller 130 triggers the validation, it can be implemented to send a request via the first external interface 110 to the host system 180 to provide the codeword for validation.

In 320 the codeword for access validation is provided. In an embodiment, the codeword is provided by a user via a user interface, for example by taping in the codeword in a pop-up window appearing on a screen of the host system. The program for providing the user interface, e.g. the pop-up window, and transferring the entered codeword via the first external interface to the security controller 130 can be executed by the security controller 130. In another embodiment such a program can be stored in a memory residing in the security device 100 and can be executed by the host system.

Alternative methods or means for providing the codeword via the first external interface, automatically or by user input, are also possible.

In 210, the security controller 130 receives the codeword via the first external interface 110, and performs the access right validation, for example as described based on FIG. 2.

Figure 4:
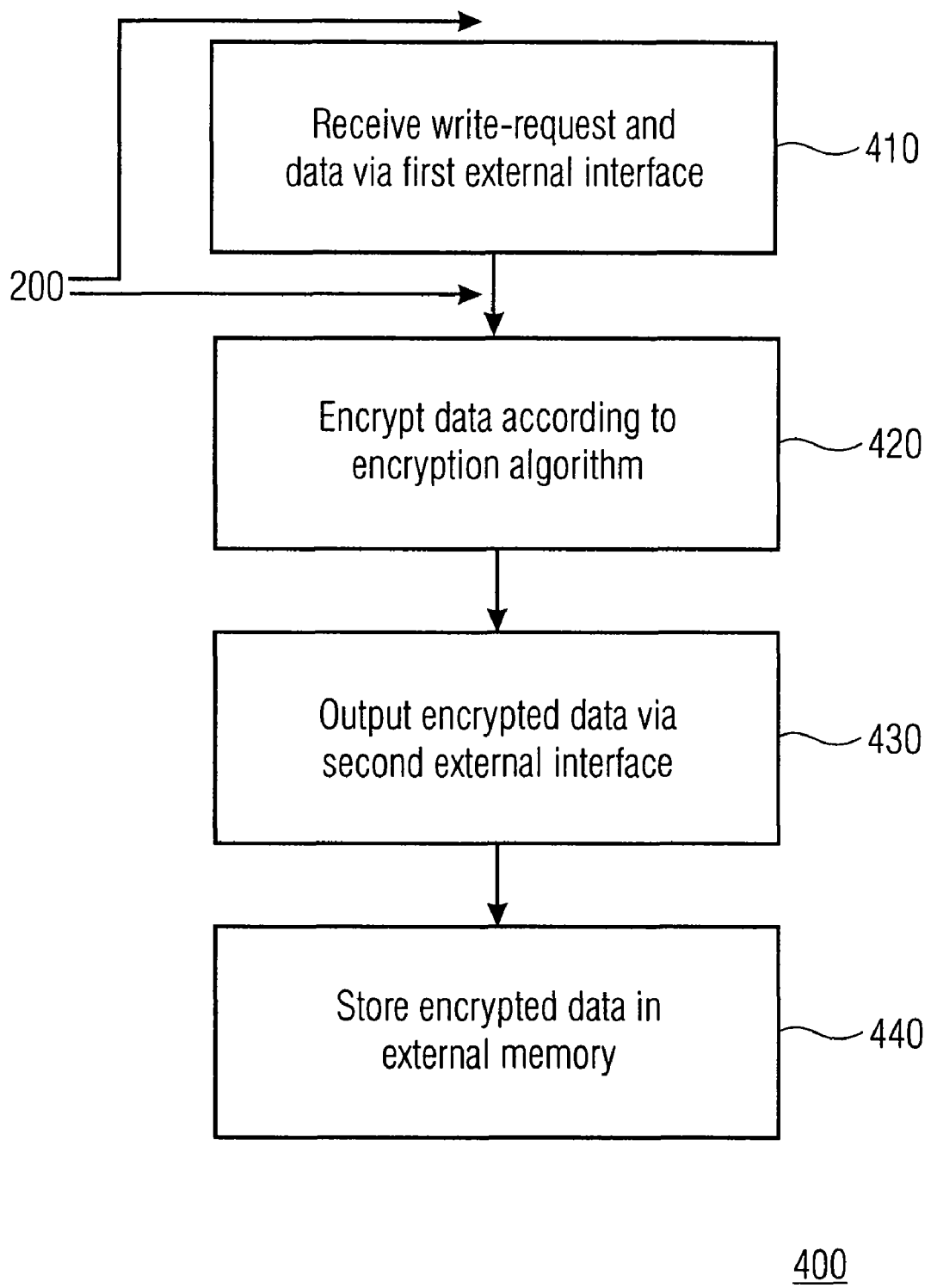
FIG. 4 shows a first embodiment of an encrypted memory access, a write encrypted memory access.

FIG. 4 shows an embodiment of a "write encrypted memory access" 400, or in other words, an encrypted memory access for writing data to the external memory.

In an embodiment according to FIG. 4, the security controller 130 receives a write-request or write-command and data 114 to be written to the external memory 190 via the first external interface 110 from, for example, the host system 180.

In the case of a positive validation, see 230 in FIG. 2, the data 114 is encrypted according to an encryption algorithm by the security controller 130 to generate encrypted data 116 (420). The security controller 130 outputs (see 430) the encrypted data via the second external interface 120 and the memory interface 192 to the external memory 190, where the encrypted data 116 is stored (see 440).

The validation 200 can be performed, depending on the embodiment as described based on FIG. 2, already before the reception of the write-request or data 410, or after reception of the write-request, for example, triggered by the write-request. Corresponding examples of instances where the validation 200 can take place are shown in FIG. 4.

FIG. 4 shows the case of a positive validation. In case the validation process 200, or the validation 220 is negative, the write-encrypted memory access 400 would not be initiated at all, or stopped and prevented at that stage, at which the validation results in a negative validation, for example, after reception of the write-request, but before encrypting data 420. In other words, data 114 is not encrypted or output as encrypted data 116 to the external memory 191 via the second external interface. Furthermore, the data 114 is also not written to the external memory 190 in an unencrypted manner, i.e. as plain data as it is received. Thus, the external memory is write protected, and no data is added or no already stored data is overwritten in case of a negative validation.

Referring to FIGS. 1 and 4, the data 114 received via the first external interface 110 may also be referred to as plain data to express that this data is not encrypted but is to be encrypted by the security controller 130. This plain data 114 may be readable to anyone, but may also be already encrypted from another encryption encoder, and thus, would be additionally encrypted by the security controller 130.

Figure 5:
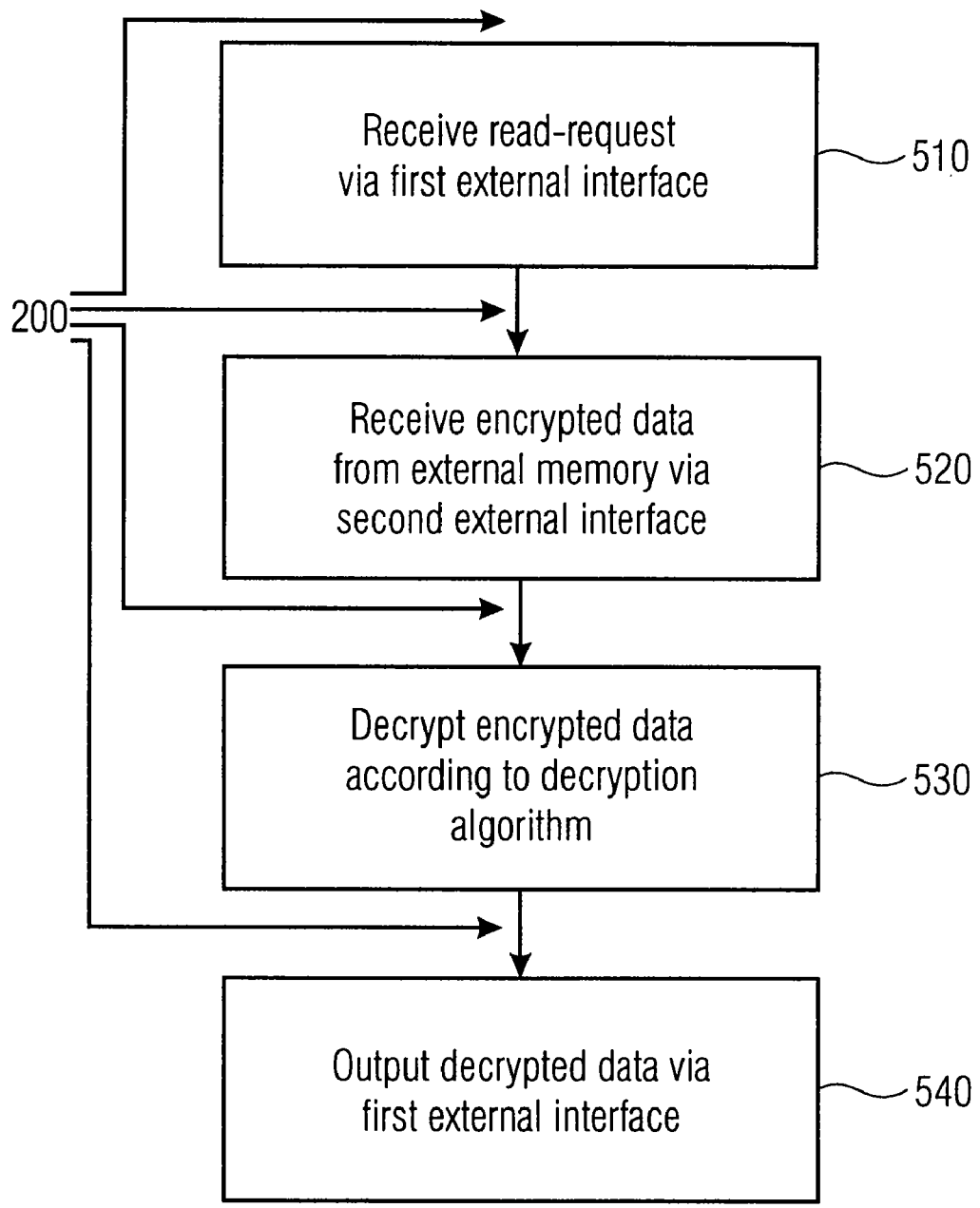
FIG. 5 shows a flow chart of a second embodiment of an encrypted memory access, a read encryption memory access.

FIG. 5 shows a flow chart of an embodiment of a "read encryption memory access" 500, in other words, an encrypted memory access for reading stored data or from the external memory 190.

In the embodiment according to FIG. 5, the security controller 130 receives a read-request or a read-command via the first external interface (see 510), for example from the host system 180.

In case of a positive access right validation, as for example described in FIG. 2, the security controller reads or receives the encrypted data 116 from the external memory 190 via the second external interface and decrypts (see 530) the encrypted data according to the decryption algorithm, to generate decrypted data 114, which may also be referred to as plain data 114. The decrypted or plain data 114 is output via the first external interface (see 540), to the host system 180 via the host system interface 182. FIG. 5 shows the flow chart for a positive validation. In case of a negative validation, as described based on FIG. 2, the negative validation stops the read-encryption memory access at time instances depending on the implementation of the access right validation process 200. Examples are shown in FIG. 5, see arrows relating to reference sign 200. In other words, the security controller 130 can be implemented to prevent or stop the encrypted memory access after reception of the read-request 510 after reception of the encrypted data 520, or even after already having decrypted the encrypted data according to 530. However, the security controller 130 will prevent—in case of a negative validation—any output of data from the external memory via the first external interface. Thus, the external memory is read protected.

Figure 6:
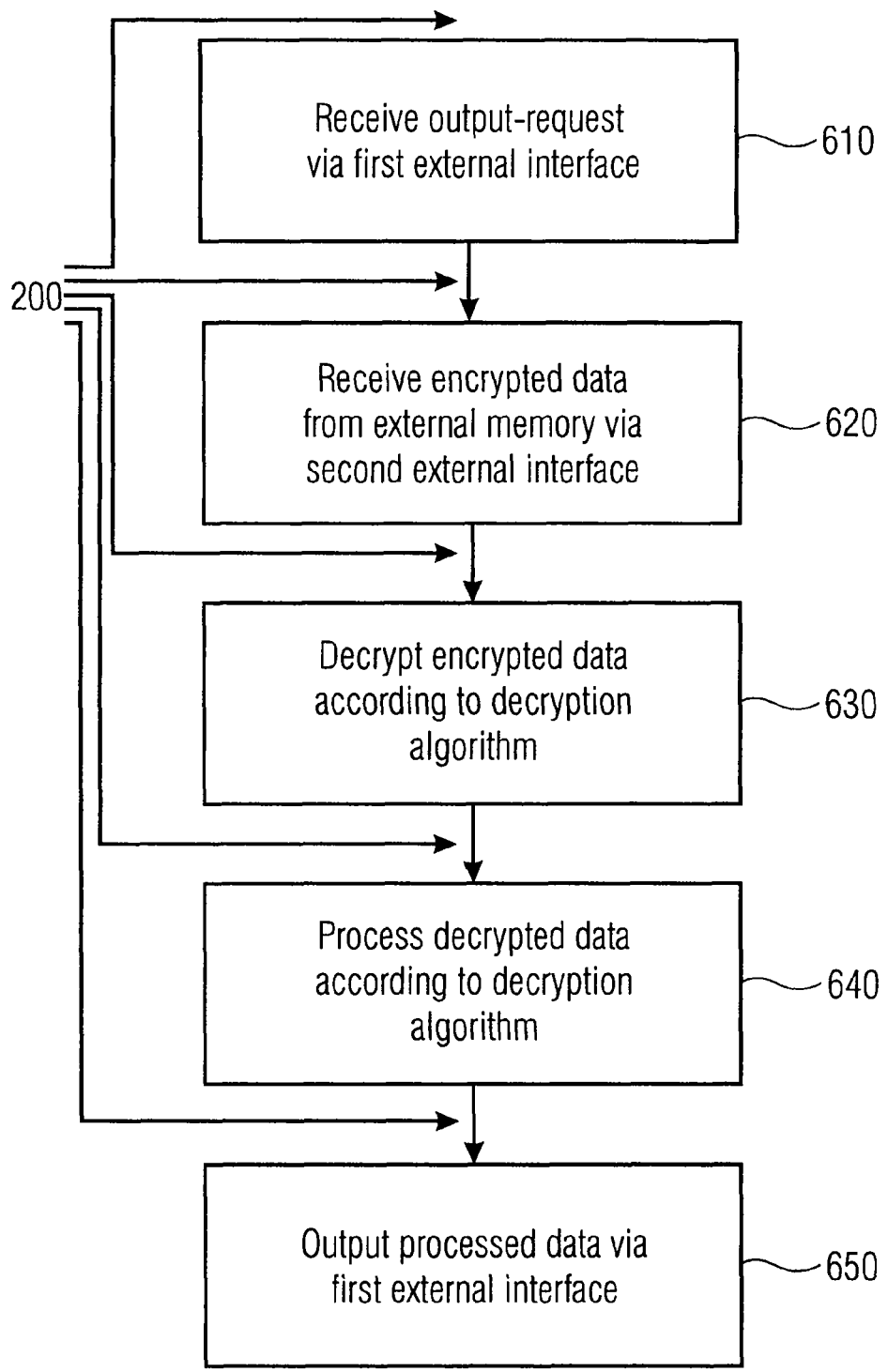
FIG. 6 shows a flow chart of a third encrypted memory access, a processed encrypted memory access.

FIG. 6 shows a flow chart of an embodiment of a "processed encrypted memory access" 600 for providing data via the first external interface 110 depending on data 116 received via the second external interface 120 from the external memory 190.

According to the embodiment in FIG. 6, in 610 the security controller 130 receives an output-request via the first external interface 110 or in other words a request for outputting processed and decrypted data from the external memory 190.

In 620, the security controller 130 reads or receives encrypted data 116 from the external memory 190 via the second external interface 120, and decrypts in 630 the encrypted data according to a decryption algorithm to generate decrypted or plain data. The decrypted or plain data is further processed according to a processing algorithm performed by the security controller 130 to generate a processed data 118. In 650 the processed data 118 is output via the first external interface 110.

Depending on the embodiment of the validation 200, as explained based on FIG. 2, the security controller 130 can be implemented to perform the access right validation at different instances of the output or processed output encryption memory access 600. Examples are shown by the arrows corresponding to reference number 200. Accordingly, in case of a negative access right validation, the security controller 130 can be implemented to stop or prevent the encrypted memory access before or after reception of the output-request 610, after reception of the encrypted data 620, after decryption 630, or after processing the decrypted data 640. In any case, the security controller 130 will prevent any output of processed data 118 via the first external interface 110 to, for example, the host system 180. Thus, the external memory is output protected.

Figure 7:
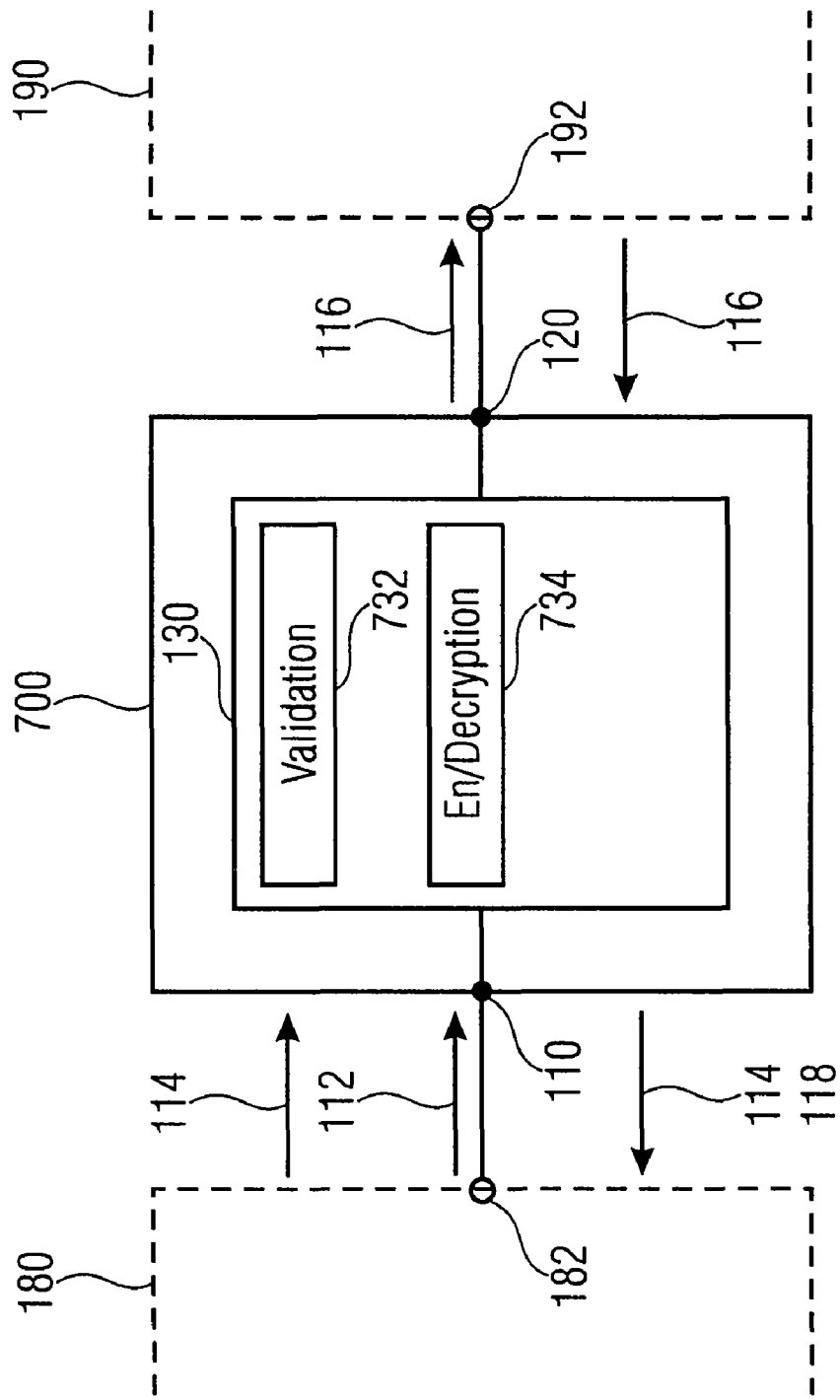
FIG. 7 shows a block diagram of an embodiment of a security device comprising a validation unit and an encryption and/or decryption unit.

FIG. 7 shows a block diagram of an embodiment of a security device 700 comprising additionally to embodiment 100 of FIG. 1, a validation unit 732 and an encryption/decryption unit 734. The validation unit 732 is adapted to perform the validation of the access right, as described within this document and can additionally be implemented to also initialize the access validation as, for example, described based on FIG. 3.

The encryption/decryption unit 734 is adapted to perform the encryption of the data or plain data 114 to generate encrypted data 116 and/or is adapted to perform the decryption according to the decryption algorithm of encrypted data 116 received from the external memory to generate decrypted or plain data 114.

Depending on the application, the security controller 130 can be adapted to perform the encryption, but not the decryption, or in other words, to only perform write-encrypted memory access operations to the external memory 190 and to comprise an "encryption unit" 734, but no "decryption unit" 735. In another embodiment, the security controller 130 can be adapted to perform read-encrypted memory access, but not perform write-encrypted memory access. In other words, the security controller 130 can be adapted to comprise a "decryption unit" 735, but no "encryption unit" 734. A possible application is to secure the access or prevent unallowed access to or from external ROM devices 190 (ROM=Read Only Memory). In other embodiments, as described previously, the security controller 130 can be adapted to perform both, read encrypted memory access and write encrypted memory access, to an external RAM device 190 (RAM=Random Access Memory).

Figure 8:
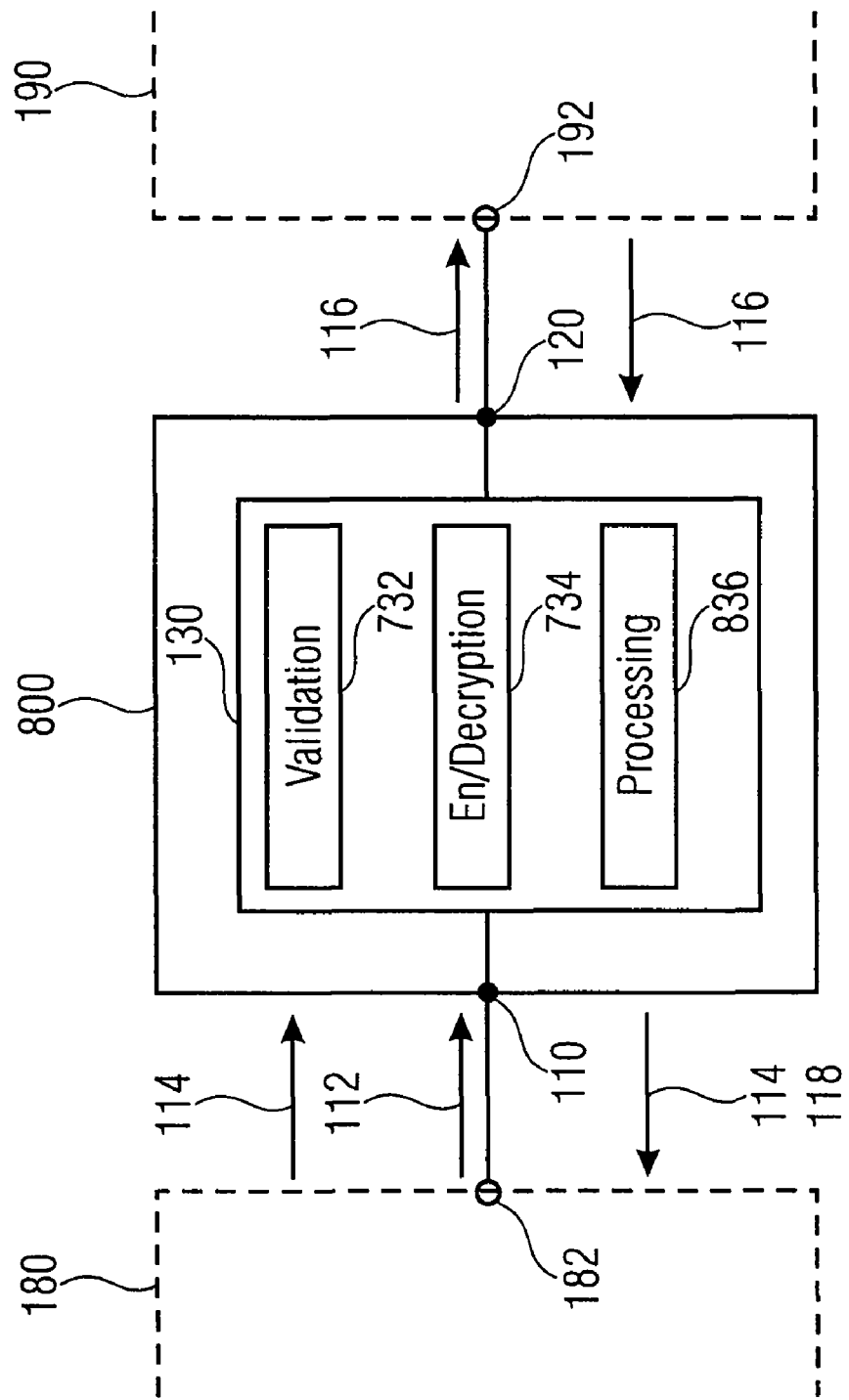
FIG. 8 shows a block diagram of an embodiment of the security device additionally comprising a processing unit.

FIG. 8 shows a block diagram of an embodiment of the security device 800, comprising additionally to the embodiment according to FIG. 7, a processing unit 736 for performing the processing of the data provided from the external memory 190 according to the processing algorithm. The processing unit 736 can be adapted to process the data decrypted by the decryption unit 734, or in other words, can be adapted to process the plain data after the decryption of the encrypted data 160. In other embodiments, the processing can be performed based on the encrypted data 116 received from the external memory, wherein the decryption is performed after the processing, or decryption and processing are performed in one single step, or based on one joint algorithm.

A further embodiment may comprise a validation unit 732, a decryption unit 734 without "write encrypted memory access" capability and a processing unit 736. Possible applications are ROM 190 content protection where the ROM content requires a specific processing of decryption before being output, for example to the host system 180. Thus, for example, smartcards or chip cards can be provided where different ROM memories can be coupled to a standard security device during manufacturing of the smart cards or chip cards. Thus, fabrication becomes more flexible with regard to providing security protection to external memories of different memory sizes or suppliers.

Figure 9:
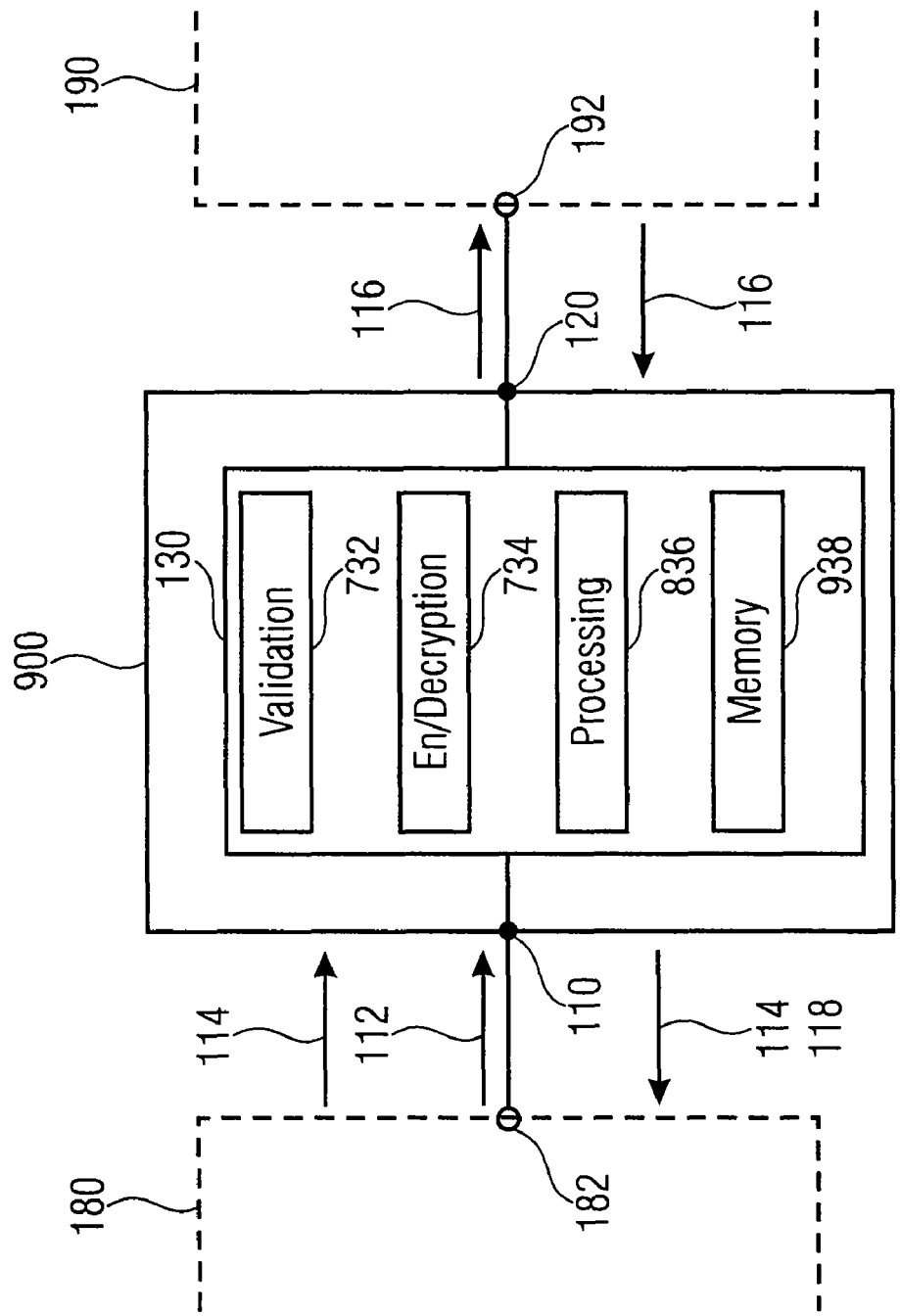
FIG. 9 shows a block diagram of an embodiment of the security device additionally comprising an internal memory.

FIG. 9 shows a block diagram of an embodiment of a security device 900, which in addition to the embodiment according to FIG. 8, comprises an internal memory 738. The internal memory may be part of the security controller 130, or external to the security controller 130 and being part of the security device 900.

The internal memory 738 can be used to store one or more keywords for the access right validation (one or more), and/or to store a program for providing a codeword 112 or for performing the access right validation as described based on FIG. 3. Accordingly, such a program may be executed by the security controller 130, by a processing unit of the host system 190, or downloaded from the internal memory 738 to the host system 180 and executed by a processing unit of the host system 180.

The internal memory 938 can be implemented to be a volatile or non-volatile memory, fuse-program, ROM to support fixed codewords or software programs, RAM to support programmable codewords and/or programs.

The units 732, 734, 836 and 938 can be implemented to be separate physical units, or can be partly or wholly integrated into one chip, forming functional logical units of this security controller chip 130.

In further embodiments, the security controller 130 can also be adapted to allow and/or control codeword changes, so that users may change their codewords to increase the security.

Figure 10:
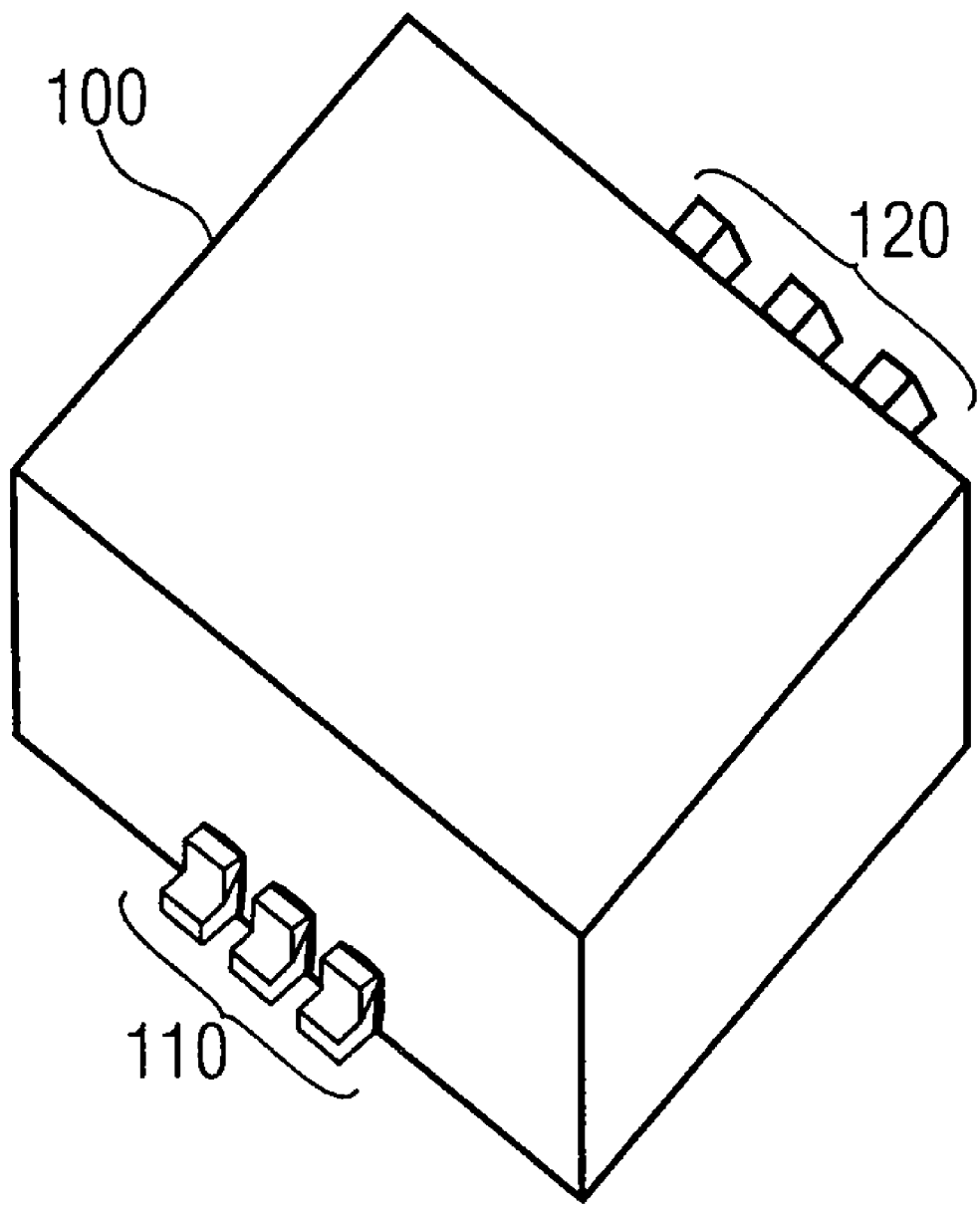
FIG. 10 shows a perspective view of an embodiment of a security device.

FIG. 10 shows a perspective view of a security device 100. The first external interface 110 and/or the second external interface 120 can comprise one or more external contacts, pads or other means 110 for externally connecting the security device 100 to, for example, the host system 180 and the external memory 190.

The form of security device 100 and its external interface or contacts depend on the interfaces to be supported, for example USB (USB=Universal Serial Bus) for the first external interface and, for example, USB, MMC, SD interfaces for memory cards or other interfaces for coupling the security device 100 with external memory chips 190 via the second external interface to provide a secure multi-chip memory system. FIG. 10 shows the first external interface 110 and a second external interface 120 with three contacts, however, the type or kind of contacts and the number of contacts has no limiting meaning and has been used for illustrative purposes only. The security device 100 can be, e.g. a security chip 100 or a security device comprising a security control chip 130.

Figure 11:
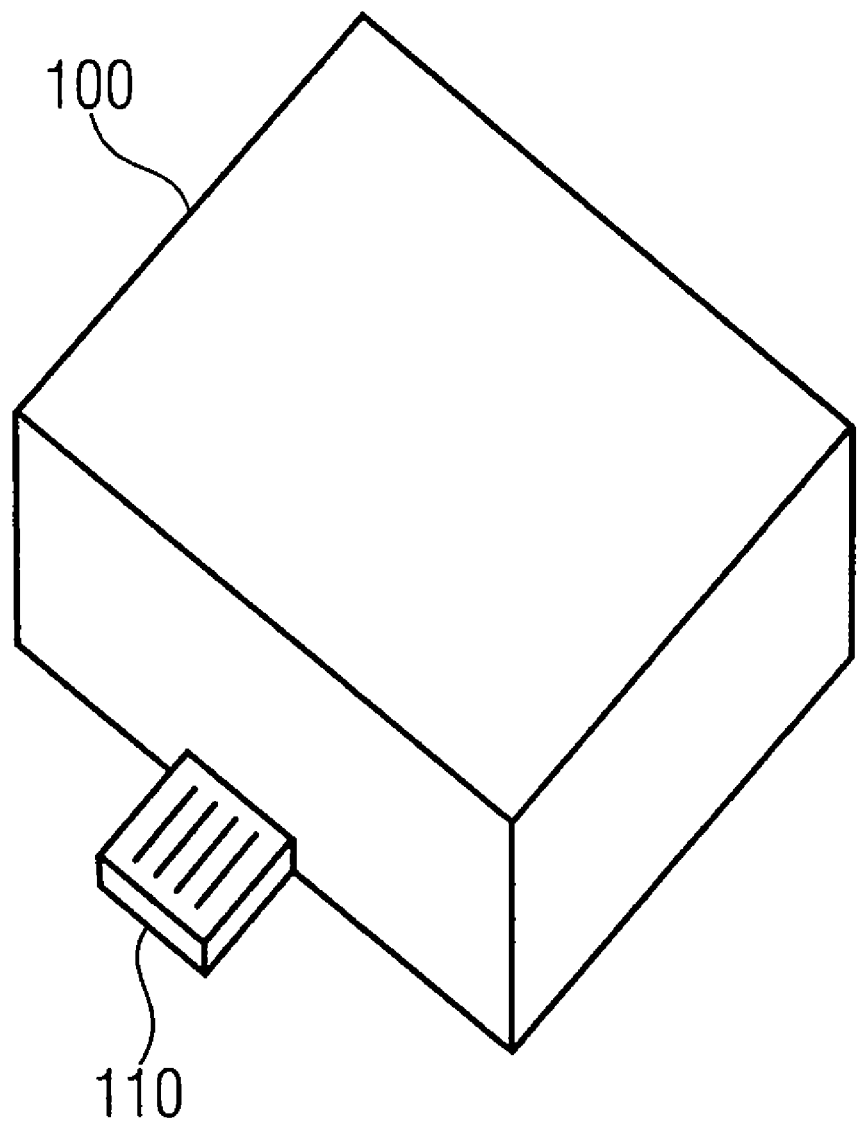
FIG. 11 shows a perspective view of another embodiment of the security device.

FIG. 11 shows a perspective view of another embodiment of a security device 100 with a first external interface 110 implemented as USB-interface, for example as male USB interface. At the back (not shown) embodiments of the security device may comprise, for example, a female USB-interface, or female interfaces or slots for connecting MMC, SD or other known memory cards.

Figure 12:
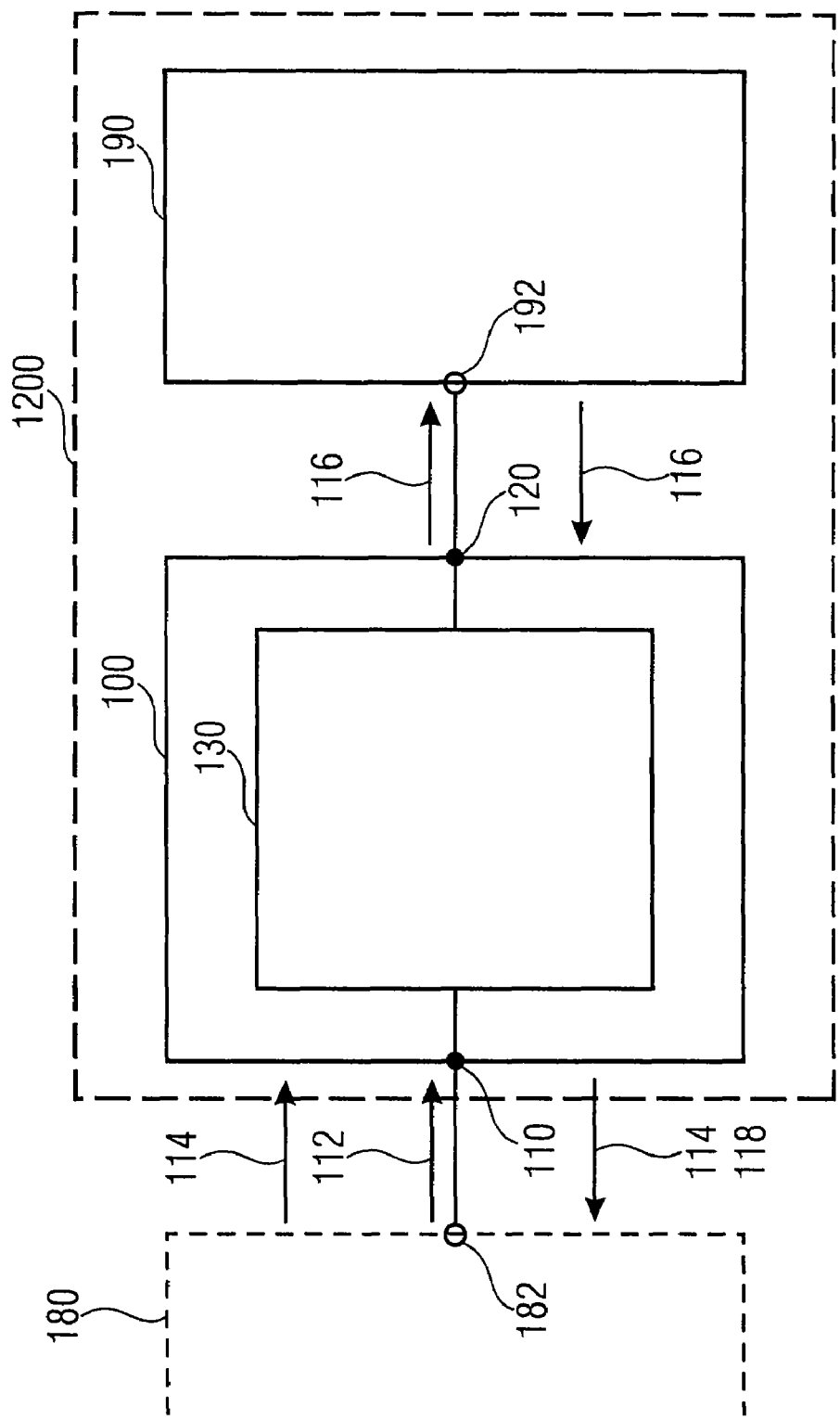
FIG. 12 shows a block diagram of a system comprising an external memory and a security device.

FIG. 12 shows a block diagram of an embodiment of a secure memory system 1200 comprising a security device 100 and a memory 190 external to the security device 100. The memory 190 can, for example, be a memory chip 190, connected via its memory interface 192 to the second external interface 120 of the security device 100. The security device 100 can also be implemented as a security chip 100.

The system 1200 can, for example, be connected via the first external interface 110 to a host system 180, for example, a host computer. The security chip 100 and the memory chip 190 can, for example, be mounted on a printed circuit board and additionally be integrated into a housing to thus provide a portable, secure memory device for an end-user.

This provides manufacturers of such devices with a flexible and efficient solution to manufacture secure memory devices 1200 by coupling, for example, memory chips of different manufacturers and/or memory size with a "standard" security chip 100 preventing unauthorized data access to the memory 190 of the secure memory system 1200. Embodiments of the security chip 100 are adapted to validate the access right based on a codeword received via the first external interface to access the memory 190. Depending on the embodiment, in case of a positive validation, data 114 to be written to the memory 190 is first encrypted by the security controller 130 and stored in an encrypted manner as encrypted data 116 on the memory. Thus, even unauthorized attempts to read the data directly from the memory interface 192 of the memory chip 190, i.e. by passing the security device 100 are prevented, unless the encryption/decryption algorithm is known to the respective person. When data is to be read from the memory 190, the security controller 130 first validates the access right and prevents any output via the first external interface 110 in case of a negative validation. In case of a positive validation, the security controller 130 decrypts the encrypted data 116 read from the memory 190 and either, outputs the decrypted data as plain data 114 (read encrypted memory access) via the first external interface 110, or additionally processes, for example, the decrypted data and outputs a processed data 118 (processed encrypted memory access) via the first external interface. Thus, as described before, based on FIGS. 1 to 11, embodiments of the present invention protect the memory 190 in an efficient manner.

The first external interface 110 (also forming the interface of the secure memory system 1200) can be any interface, for example, a USB interface.

The second external interface 120 can be any memory interface, for example, for connecting memory chips, but may also be an interface to a memory card (MMC, SD, . . . ).

In other words, by coupling the security chip 100 in front of the memory chip 190, any unauthorized access via the first external interface 110 is prevented and by encrypting/decrypting the data when writing/reading from a memory, any attempt to bypass the first external interface, for example by breaking the housing and connecting a host system 180 directly to the memory interface 192 of the memory chip 190, is also prevented as the data on the memory chip itself is encrypted.

In further embodiments, the validation process 200 is performed before any read/write or other output operation is performed. Thus, not only read or output memory operations via the first external interface 110 can be prevented, but also unauthorized write operations, potentially overwriting or erasing existing encrypted data stored on the memory 190.

In another embodiment, the security device 100 is, used as a standalone device without an external memory 190 coupled to it in a permanent manner, for example by a common housing and/or mounting on a common printed circuit board as described in the previous embodiment for a security system 1200. Such embodiments can, for example, have a USB-interface as a first external interface and a second USB-interface, or a different interface, for example a USB interface as first external interface and for interfacing MMC or SD memory cards, as second external interface, as described based on FIG. 11.

These standalone security devices 100 can be used in combination with USB-memory sticks or memory cards having no own protection mechanisms to thus protect data stored on these memory sticks or memory cards. When writing data to these standard memory sticks or memory cards, the security device 100 is connected between the host system and the memory stick or memory card, and encrypts in case of positive validation plain data provided by the host system and writes the encrypted data to the memory card, which stores the data as encrypted data. In case of a read-request or output request from the memory, the security device first validates the access right and prevents any read operation or processed output operation in case the validation is negative.

Therefore, data on these standard memory sticks or memory cards are protected against unauthorized access to the memory stick or memory card, unless the respective person has the security device and additionally knows the codeword. Thus, the person incidentally finding, for example, the memory stick or memory card together with the security device can still not access the memory, as he does not know the codeword.

Furthermore, embodiments of the standalone security device can use the same security device for different memory sticks or memory cards. Further embodiments also support different passwords for validating access rights for different memory sticks or memory cards with different codewords. The security controller 130 can be adapted to receive information over the second external interface from the different memory cards or memory sticks 190 to distinguish these, and to apply the respective specific codeword for the respective validation.

In further embodiments, the codeword for the access right validation can also be used by the security controller 130 to perform the encryption/decryption algorithm, depending on the codeword, for example, by using the codeword as part of a larger encryption/decryption key. Thus the security with respect to embodiments using a key, which is independent of the codeword, can be further increased.

In further embodiments, the security controller 130 can be adapted to comprise a first external interface 110, a second external interface 120, and a security controller 130 connected to the first external interface 110 and the second external interface 120. The security controller can be adapted to perform an encrypted memory access via the second external interface 120 to an external memory 190 coupleable to the second external interface, based on the codeword 112 received via the first external interface 110. In other words, the encryption/decryption algorithm is performed depending on the codeword, for example, by using the codeword as, or at least as part of a larger encryption key. Thus, the access to the memory is not prevented in the sense of the aforementioned embodiments, i.e., not blocked, but prevented in a different manner, i.e., by providing no useful data when not using the correct codeword, as for example the decryption with a different codeword than the codeword that has been used for encryption, does not provide any useful "plain" data after decryption.

In typical embodiments, the decryption algorithm is the respective algorithm to decrypt the data 116 which has been encrypted by the aforementioned encryption algorithm, or in other words, is the respective decryption algorithm to regain the original plain data 114 which was encrypted before by the encryption algorithm.

In further embodiments, the encryption algorithm depends on the memory address the data is to be stored on the external memory to further increase the security of the stored data, e.g. in view of brute force attacks.

Referring to the previous explanations, embodiments comprise a USB-stick which is connected to a security controller with a USB-interface, which has a connection to a changeable data carrier chip, for example MMC, SD or other known memory card types. Thus, data to be stored on the memory chip can be encrypted using the security controller. On the other hand, memory capacities can easily be adapted to the market requirements by inserting memory carriers with larger memory sizes in the USB-stick.

Embodiments describe arrangements for coupling a security controller to a USB-interface and a changeable data carrier to provide security controllers with large memory capacities.

In one embodiment, the security controller is used in a USB-stick to connect the data carrier or memory chip with the USB-interface, where the data carrier, for example, a memory card, is inserted into the USB-stick and the data on the external memory are encrypted for security reasons.

Depending on certain implementation requirements of the inventive methods, the inventive methods can be implemented in hardware or in software. The implementation can be performed using a digital storage medium, in particular, a disc, CD, or a DVD having an electronically readable control signal stored thereon which cooperates with a programmable computer system such that an embodiment of the inventive methods is performed. Generally, an embodiment of the present invention is, therefore, a computer program produce with a program code stored on a machine-readable carrier, the program code being operative for performing the inventive methods when the computer program product runs on a computer. In other words, embodiments of the inventive methods are therefore, a computer program having a program code for performing at least one of the inventive methods when the computer program runs on a computer.

The aforegoing has particularly shown and described with reference to particular embodiments thereof, it will be understood by those skilled in the art that various other changes in the form and details may be made without departing from the spirit and scope thereof. It is therefore to be understood that various changes may be made in adapting to different embodiments without departing from the broader concept disclosed herein and comprehended by the claims that follow.

The invention claimed is:

1. A security device, comprising:
a first external interface;
a second external interface; and
a security controller connected to said first external interface and said second external interface, said security controller being adapted to:
validate an access right based on a codeword received via said first interface to perform an encrypted memory access via said second external interface to an external memory coupleable to said second external interface, and
prevent said encrypted memory access via said first external interface or prevent any output of data via said first external interface with the data output depending on encrypted data received via said second external interface, in case of a negative validation,
wherein the first external interface is a male USB connector and the second external interface is a female USB connector with the external memory being a USB stick, or the first external connector is a male USB connector and the second external connector is a memory card slot connector with the external memory being a memory card, and
wherein said security controller is adapted to: in case of the negative validation, prevent said encrypted memory access via said first external interface from causing any changes of a memory content of the memory card via said second external interface and any leaking of the memory content to outside via the via said first external interface, and, in case of a positive validation, completely execute said encrypted memory access; perform said encrypted memory access in case of a positive validation:
by encrypting data received via said first external interface or data derived there from using an encryption algorithm and outputting the encrypted data received via said first external interface to said external memory via said second external interface; and/or
by decrypting the encrypted data received from said external memory via said second external interface using a decryption algorithm and outputting said decrypted data or data derived there from via said first external interface; and
use said codeword at least as part of an encryption key for said encryption algorithm or at least as part of a decryption key for said decryption algorithm.

2. A security device according to claim 1, wherein said security controller is adapted to output the data via said first external interface depending on the encrypted data received from said external memory via said second external interface in case of a positive validation.

3. The security device according to claim 1, wherein said first external interface is a USB-interface.

4. The security device according to claim 1, further comprising an internal memory for storing a program to be executed to enable said receiving of said codeword.

5. The security device according to claim 1, wherein the first external interface is a first plug connection and the second external interface is a second plug connection.

6. The security device according to claim 1, wherein the first external interface is a male plug.

7. The security device according to claim 6, wherein the second external interface is a female socket conforming to the male plug.

8. The security device according to claim 7, wherein the security device is portable.

9. The security device according to claim 1, wherein the security device is portable.

10. A security device, comprising:
a first external interface;
a second external interface; and
a security controller connected to said first external interface and said second external interface, said security controller being adapted to perform, based on a codeword, used to validate an access right to perform an encrypted memory access, received via said first interface, an encrypted memory access via said second external interface to an external memory coupleable to said second external interface, wherein said security controller is further adapted to perform said encrypted memory access:
by encrypting data received via said first external interface or data derived there from using an encryption algorithm and said codeword at least as part of an encryption key for said encryption algorithm and by outputting the encrypted data to said external memory via said second external interface; and/or by decrypting encrypted data received from said external memory via said second external interface, using a decryption algorithm and said codeword at least as part of a decryption key for said decryption algorithm and by outputting said decrypted data or data derived there from via said first external interface, wherein the first external interface is a male plug, and the second external interface is a female socket conforming to the male plug.

11. The security device according to claim 10, wherein the first external interface is a first plug connection and the second external interface is a second plug connection.

12. The security device according to claim 10, wherein the first external interface is a male USB connector and the second external interface is a female USB connector with the external memory being a USB stick.

13. The security device according to claim 12, wherein said security controller is adapted to
validate an access right based on the codeword,
in case of a negative validation, prevent said outputting of said encrypted and decrypted data, respectively, and
in case of a positive validation, finish said encrypted memory access.

14. A secure memory system, comprising:
a memory chip; and
a security device, the security device comprising:
a first external interface;
a second external interface; and
a security controller connected to said first external interface and said second external interface, said security controller being adapted to
validate an access right based on a codeword received via said first interface to perform an encrypted memory access via said second external interface to an external memory coupleable to said second external interface, and
prevent that encrypted memory access via said first external interface or prevent any output of data via said first external interface with the data output depending on encrypted data received via said second external interface, in case of a negative validation,
wherein the first external interface is a male USB connector and the second external interface is a female USB connector with the external memory being a USB stick, or the first external connector is a male USB connector and the second external connector is a memory card slot connector with the external memory being a memory card, and wherein said security controller is adapted to:
in case of the negative validation, prevent said encrypted memory access from causing any changes of a memory content of the memory card via said second external interface and any leaking of the memory content to outside via the via said first external interface, and, in case of a positive validation, completely execute said encrypted memory access;
perform said encrypted memory access in case of a positive validation:
by encrypting data received via said first external interface using an encryption algorithm and outputting said encrypted data to said external memory via said second external interface; and/or
by decrypting encrypted data received from said external memory via said second external interface using a decryption algorithm and outputting said decrypted data via said first external interface; and
use said codeword at least as part of an encryption key for said encryption algorithm or at least as part of a decryption key for said decryption algorithm.

15. The secure memory system according to claim 14 wherein said security controller is adapted to output data via said first external interface depending on encrypted data received from said external memory via said second external interface in case of a positive validation.

16. The secure memory system according to claim 14, wherein said first external interface is a USB-interface.

17. The secure memory system according to claim 14, further comprising:
an internal memory for storing a program to be executed to enable said receiving of said codeword.

18. The security device according to claim 14, wherein the first external interface is a first plug connection and the second external interface is a second plug connection.

19. The secure memory system according to claim 14, wherein the security device is portable.

20. A method for securing data stored on an external memory using a security device, the security device comprising a first external interface, a second external interface and a security controller connected to said first external interface and said second external interface; the method comprising:
validating an access right to perform an encrypted memory access via said second external interface to said external memory coupled to said second external interface by said security controller based on a codeword received via said first external interface; and
preventing said encrypted memory access via said first external interface or preventing any output of data via said first external interface depending on data received via said second external interface in case of a negative validation,
wherein the first external interface is a male USB connector and the second external interface is a female USB connector with the external memory being a USB stick, or the first external connector is a male USB connector and the second external connector is a memory card slot connector with the external memory being a memory card, and
wherein the method comprises, in case of the negative validation, preventing said encrypted memory access from causing any changes of a memory content of the memory card via said second external interface and any leaking of the memory content to outside via the via said first external interface, and, in case of a positive validation, completely executing said encrypted memory access:
wherein said encrypted memory access comprises:
encrypting data received via said first external interface using an encryption algorithm and outputting said encrypted data to said external memory via said second external interface; and/or
decrypting encrypted data received from said external memory via said second external interface using a decryption algorithm and outputting said decrypted data via said first external interface; and
wherein the method comprises using said codeword at least as part of an encryption key for said encryption algorithm or at least as part of a decryption key for said decryption algorithm.

21. The method according to claim 20, wherein said encrypted memory access comprises decrypting encrypted data received from said external memory via said second external interface using a decryption algorithm, processing said decrypted data using a processing algorithm and outputting said processed data via said first external interface.

22. The method according to claim 20, wherein said validating comprises executing a software program to allow a user to input the codeword for the access right validation.

23. The method according to claim 22, wherein said software program for allowing said user input is performed by said security controller.

24. The method according to claim 20, wherein the first external interface is a first plug connection and the second external interface is a second plug connection.

* * * * *